March 22, 1955 P. R. WESTNES 2,704,414
LINE CONTROLLING BOBBER
Filed Dec. 29, 1953
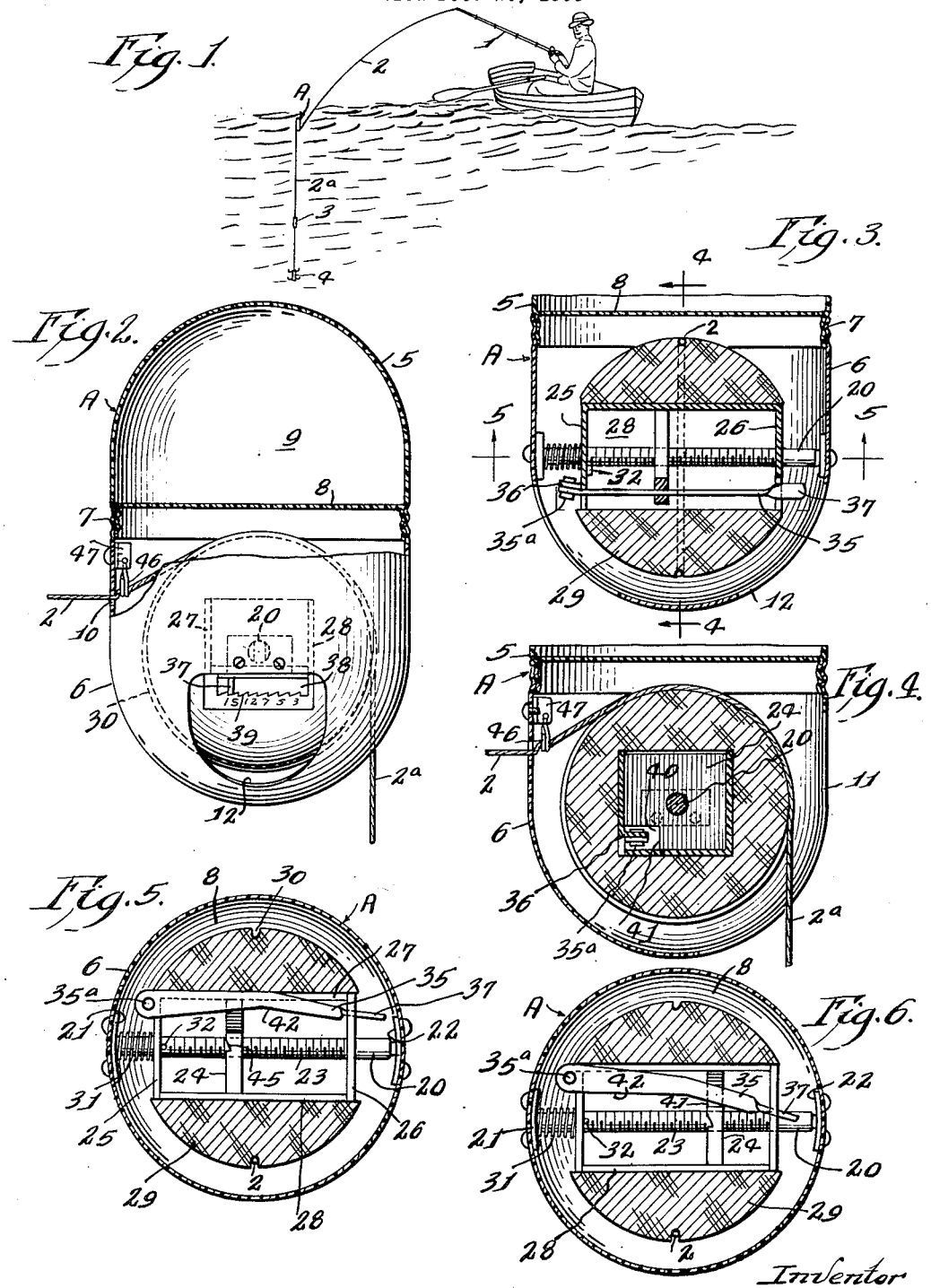
Inventor
Peder R. Westnes United States Patent Office 2,704,414
Patented Mar. 22, 1955

2,704,414

LINE CONTROLLING BOBBER

Peder R. Westnes, Chicago, Ill.

Application December 29, 1953, Serial No. 401,004

4 Claims. (Cl. 43—43.1)

This invention relates to a bobber and, more particularly, to a fishing bobber for use with a fishing line to measure and control the length of line permitted to extend downwardly into the water from the bobber.

An object of this invention is to provide a new and improved fishing bobber.

Another object of the invention is to provide a bobber which may be set to measure and hold variable predetermined lengths of line extending from the bobber.

Another object of the invention is to provide a bobber through which a fishing line passes having means disposed therein for measuring a certain amount of line passing through the bobber, as determined by manually settable mechanism within the bobber, and for preventing passage of further line through the bobber.

Another object of the invention is to provide a bobber having a two-part casing, one part having a watertight compartment for imparting buoyancy to the bobber and the other part having means for measuring and controlling the amount of line that may pass through the bobber.

Another object of the invention is to provide a bobber, as defined in the preceding paragraph wherein the means for measuring and controlling the amount of line passing through the bobber comprises a shaft extending transversely to the path of movement of the line through the bobber having a screw-threaded portion intermediate its ends, a housing rotatably mounted on the shaft, a ball-shaped pulley member surrounding the housing for guiding the line and for preventing movement of the line when said member is stopped, a nut threaded on the threaded portion of the shaft and confined within the housing for rotation therewith and movement back and forth on said shaft, and a control arm pivotally mounted at one end of the housing and extending through and beyond an opening in the other end of the housing, said control arm being angularly movable about its pivot to various positions wherein it engages a recess in one corner of the nut after different lengths of travel of the nut as caused by the line passing through the bobber to control the length of line extending from the bobber.

Another object of the invention is to provide a bobber, as defined in the preceding paragraph, wherein the housing is held in position along the fixed shaft by a lug on the shaft positioned just within the housing, and a light spring urging the housing toward said lug, and having means for retarding reverse movement of the line through the bobber.

The objects of the invention generally set forth, together with other ancillary advantages, are attained by the construction and arrangement shown by way of illustration in the accompanying drawing, in which:

Fig. 1 is a diagrammatic view showing the bobber as used with a fishing rod and line;

Fig. 2 is a view in elevation of the bobber with parts in section;

Fig. 3 is a fragmentary section in elevation of the bobber showing parts in section.

Fig. 4 is a sectional view in elevation taken along the line 4—4 in Fig. 3;

Fig. 5 is a horizontal sectional view of the bobber taken along the line 5—5 of Fig. 3; and, Fig. 6 is a horizontal sectional view similar to Fig. 5 but showing a different position of the movable parts.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

My new and improved bobber A is intended for use, as shown in Fig. 1, with a fishing rod 1 having a line 2 extending therefrom through the bobber A and downwardly therefrom beneath the surface of the water, the portion of the line extending downwardly from the bobber A being indicated by 2a. Secured to the end of the portion 2a of the line may be a weight 3 and fly 4 or other suitable hook devices depending upon the type of fishing that is being done.

When casting and also ocasionally in still fishing when the line extends from the rod a substantial distance, it is desired to have the hook extend a predetermined distance beneath the surface of the water. My new and improved bobber is such that it may be set prior to being cast on the water so that a predetermined amount of line may extend from the bobber beneath the surface of the water.

As shown in Figs. 2, 3 and 4, the bobber comprises a casing having an upper substantially hemispherical part 5 and a lower substantially hemispherical part 6 provided with interengaging threads 7 for securing the parts together. The upper part 5 of the casing is provided with a circular plate 8 which encloses the major portion of the upper part 5 to form an empty watertight chamber 9 which imparts buoyancy to the bobber A. Alternatively, the plate 8 could be omitted and cork material placed in the upper part 5 to impart buoyancy to the bobber A.

The lower part 6 of the casing is provided with an opening 10 which permits entry of the line into the bobber and an opening 11 which permits passage of the line out of the bobber. A third opening 12 in the casing permits setting of the line measuring mechanism more fully described hereinafter.

The means for measuring and controlling the length of line extending from the bobber comprises a shaft 20 fixedly mounted to oppositely disposed areas of the casing by brackets 21 and 22 which may be secured to the casing in a suitable manner. The shaft 20 extends transversely to the path of movement of the line through the bobber and has intermediate its ends a threaded portion 23 on which is threaded a nut 24. A housing having its end walls 25 and 26 provided with openings for receiving the shaft 20 is rotatably mounted on the shaft 20. The housing also has side walls 27 and 28 which confine the nut 24 for rotation therewith, the cross-sectional area of the nut being substantially the same as that of the housing. Surrounding the housing is a ball-shaped pulley member 29, which may be of cork material, which is provided with a peripheral groove 30 for frictionally engaging the line as it passes through the bobber.

The housing is held in a fixed position along the length of the shaft 20 by means of a light spring 31 which is of a length only sufficient to exert a force against the housing if it should shift to the left and which urges the housing towards the right, as viewed in Fig. 3, toward a cooperating stop lug 32 which engages the inside surface of the end wall 25.

A control arm 35 having a slight bend is pivotally mounted by a pivot pin 35a to a flange 36 formed from a bent-out part of the end wall 25. The control arm 35 extends through the housing and has an end 37 which extends outwardly of the housing through an opening 38 in the end wall 26 of the housing. The control arm 35 is mounted for angular movement about its pivot and is held in its adjusted position by engagement of the handle end 37 thereof with upstanding projections providing notches 39 therebetween formed along the lower edge of the opening 38. The control arm is made of a spring material so that with a slight upward bend in the flange 36 forming the pivot for the control arm 35, the handle end 37 of the control arm is yieldably held in one of the notches 39 and released therefrom for resetting of the arm by a slight upward force against the handle end 37 which flexes the arm. The end wall 26 of the casing may be provided with indicia, as shown, to indicate the setting of the arm with regard to how many feet of line may pass through the bobber.

The nut 24 is confined within the housing for rotation therewith on the fixed shaft 20 but may move lengthwise back and forth along the shaft 20 relative to the housing. The nut in one corner thereof has a recess portion 40 including a face portion 41 which engages with a cam surface 42 on the control arm 35.

The position of the nut 24 along the threaded portion 23 of the fixed shaft 20 where this engagement occurs is determined by the angular position of the control arm 35.

When setting the bobber, the nut 24 will be at the left hand end of the housing, looking at Fig. 3, adjacent the end wall 25. The control arm 35 is then set to determine the length of line that may pass through the bobber after it is cast. If a relatively short length of line is desired, it is necessary that the pulley member 29 be permitted to rotate a relatively few revolutions. This is accomplished by setting the control arm 35 so that it angles across the housing and places its cam surface 42 so that it will engage the face 41 of the recess in the nut 24 shortly after the nut begins to move along the shaft 20 toward the right, as viewed in Fig. 3, as caused by line passing through the bobber. This will stop movement of the nut 24 along the shaft 20 and then prevent rotation of the nut and also the housing and pulley member 29 which are secured for rotation with the nut 24. If a longer length of line extending from the bobber is desired, the control arm 35 is adjusted so that it makes less of an angle across the housing. This will permit the nut 24 to travel a greater distance along the shaft 20 from its starting position before the cam surface 42 engages the face 41 of the recess 40 in the nut 24. This will result in an increased number of revolutions of the pulley member 29 and more line extending from the bobber A. As the line is drawn back through the bobber by winding of the fishing reel, the nut 24 travels back to its initial starting position.

In Fig. 5, it will be noted that the engagement between the face 41 of the nut 24 and cam surface 42 of the control arm 35 has not occurred and that the nut must travel to its right hand limit of movement before it will be stopped. This results in paying out the maximum length of line. In Fig. 6, the engagement between the face 41 and cam surface 42 has occurred before the nut 24 reaches its right-hand end position because of the different angular positioning of the control arm 35. This causes the paying out of a lesser length of line.

Another function of the stop lug 32 is to prevent binding of the nut 24 as it reaches it left-hand starting position. The stop lug 32 engages with a notch 45 provided in the nut and spaces the nut from the end wall 25 of the housing so that the face of the nut adjacent said wall may not come into contact therewith and cause binding of the nut.

In order to retard unintended reverse movement of the line 2 through the bobber, a drag member is fastened to the casing adjacent the opening 10 by a bracket 47. This member comprises a wire pivotally mounted on the bracket 47 and having an eye through which the line 2 passes. The eye in the wire 46 is positioned just above the opening 10 so that there will be a slight snubbing of the line between the wire and casing when the line passes out of the casing through opening 10.

I claim:

1. A bobber for use with a fishing line for measuring and controlling the length of fishing line extending from the bobber downwardly into the water comprising, a casing formed of two generally hemispherical parts having interengaging threaded means for securing said parts together, one part of said casing having a water-tight empty float chamber and the second part of the casing having a relatively thin outer casing and means in said casing defining openings for permitting passage of the line therethrough, means in said second part of the casing for measuring and controlling the amount of line that may pass through the bobber including a fixed shaft disposed transversely to the path of movement of the line through the bobber and having its ends fixedly secured to oppositely disposed wall surfaces of the casing, said shaft having a screw-threaded portion intermediate its ends, a housing rotatably mounted on said shaft and provided with an opening in one end thereof, a ball-shaped member fixed to and enclosing said housing and having a groove on the periphery thereof for receiving the line as the line moves between the said openings in the casing, the movement of the line between the openings in the casing causing rotation of the member and housing on the shaft, a control arm extending through the housing pivotally mounted at one end corner of the housing and extending outwardly of the opening in the other end of the housing, a nut threaded on said shaft for movement back and forth along said shaft and having a cross-sectional area substantially equal to that of the housing so that said nut is confined in the housing for rotational movement with the housing and ball-shaped member, the rotation of the housing by the line passing through the bobber while engaged in the groove of the ball-shaped member causing movement of the nut along the shaft, said nut having a recess in one corner thereof through which the control arm extends, said control arm having a cam surface for selective engagement with a face of said recess in the nut for holding the nut against movement along said shaft to thus prevent rotation of the nut, housing and ball-shaped member and prevent further movement of the line relative to the housing, and means for adjusting and holding said control arm in different angular positions on its pivot relative to the housing to control the distance the nut may travel along the shaft before the cam surface engages said face and thus control the number of rotations of the ball, said housing being provided with notches at the open end thereof in which the free end of said arm may be engaged, the construction and arrangement being such that the amount of line adapted to pass through the bobber may be predetermined by the setting of said control arm.

2. A bobber as described in claim 1 including, a stop lug on said shaft positioned just within the housing for holding said housing in a predetermined position along the length of the shaft, a light spring on said shaft for urging said housing toward said lug, said nut being provided with a notch cooperating with said lug to space the nut from the end of the housing and prevent binding between the nut and housing.

3. A bobber for use with a fishing line for measuring and controlling the length of fishing line extending from the bobber comprising, a casing formed of two parts having interengaging threaded means for securing said parts together, one part of said casing having a relatively thin outer casing and means defining openings for permitting passage of the line therethrough, means in said one part of the casing for measuring and controlling the amount of line that may pass through the bobber including a shaft disposed transversely to the path of movement of the line through the bobber and having its ends fixedly secured to said casing, said shaft having a screw-threaded portion intermediate its ends, a housing rotatably mounted on said shaft and provided with an opening in one end thereof, a pulley member fixed to and surrounding said housing and having a groove on the periphery thereof for receiving and moving with the line as the line moves between the said openings in the casing, a nut mounted on the threaded portion of the shaft for movement from a starting position adjacent one end of the shaft to a preselected stopping position along the shaft and having a cross-sectional area substantially equal to that of the housing so that it is confined in the housing for rotational movement with the housing pulley member, said nut having a recess in one corner thereof, a control arm pivotally mounted at one end corner of the housing and extending through the recess in said nut and outwardly of the opening in the other end of the housing, said control arm having a cam surface for selective engagement with a wall in the said recess in the nut for holding the nut against movement along said shaft to prevent rotation of the nut, housing and pulley member and prevent further movement of the line, and means for adjusting and holding said arm in different angular positions to control the distance from said starting position at which the cam surface will engage the nut to thus control the number of rotations of the pulley member, said means comprising upstanding projections at the open end of the housing providing notches in which the free end of the arm may be engaged.

4. A bobber for controlling the amount of fishing line permitted to extend downwardly from the bobber including, a thin wall casing having means for imparting buoyancy to the bobber said casing being provided with a hollow cavity, a shaft extending across the cavity and fixedly secured to the walls of the casing, said shaft having a screw-threaded portion intermediate its ends, a pulley member rotatable about said shaft having means about its periphery for frictionally engaging the line for causing rotation of the member with the line as the line passes through the casing and for holding the line against movement when said member is stopped, means within said member for controlling the number of rotations of said member including a nut threaded on said shaft for movement therealong and confined for rotational movement with said member, and means including a settable control arm made of spring material, said arm having a cam surface engageable with the nut, for varying the permitted length of travel of the nut along the shaft in response to rotation of the member to control the number of rotations of the member and thus the length of line which may pass through the bobber.

References Cited in the file of this patent

UNITED STATES PATENTS

| | | |
|---|---|---|
| 2,497,355 | Hagen | Feb. 14, 1950 |
| 2,531,940 | Kirschman | Nov. 28, 1950 |
| 2,646,643 | Nordlund | July 28, 1953 |
| 2,682,129 | Hamilton | June 29, 1954 |